(12) United States Patent
Adiga et al.

(10) Patent No.: US 6,592,361 B2
(45) Date of Patent: Jul. 15, 2003

(54) PROCESS FOR PRE-HEATING A HYDRO-FUEL AND PRODUCING IN-SITU STEAM FOR COOKING

(76) Inventors: Kayyani C. Adiga, 4999 Oxford Rd., Macon, GA (US) 31210; Rajani Adiga, 4999 Oxford Rd., Macon, GA (US) 31210

(*) Notice: Subject to any disclaimer, the term of this patent is extended or adjusted under 35 U.S.C. 154(b) by 0 days.

(21) Appl. No.: 09/860,231

(22) Filed: May 17, 2001

(65) Prior Publication Data

US 2002/0009685 A1 Jan. 24, 2002

Related U.S. Application Data

(60) Provisional application No. 60/205,598, filed on May 17, 2000.

(51) Int. Cl.⁷ ................................................. F23D 11/44
(52) U.S. Cl. ........................... 431/4; 431/247; 431/232; 126/39 D
(58) Field of Search ................................. 126/43, 39 D; 431/232, 247, 4; 99/339; 426/314

(56) References Cited

U.S. PATENT DOCUMENTS

| | | | | |
|---|---|---|---|---|
| 5,189,945 A | * | 3/1991 | Hennick | 99/339 |
| 5,080,580 A | * | 1/1992 | Clapp | 431/232 |
| 5,143,046 A | * | 9/1992 | Koziol | 126/43 |

\* cited by examiner

*Primary Examiner*—Henry Bennett
*Assistant Examiner*—Sabrina Dagostino
(74) *Attorney, Agent, or Firm*—Brian D. Bellamy

(57) ABSTRACT

The present invention provides a process of cooking foods using a hydro-fuel to produce super heated in-situ steam. The hydro-fuel is propelled at a regulated flow rate into a pre-heating tube situated near a burner that is used in cooking, but also heats the tube. The pre-heating hydro-fuel is mixed with air in a mixing chamber to form a fuel-air mixture that is then transported to a burner tip on the burner. The fuel-air mixture is ignited at said burner tip to cause combustion producing the release of hot gases and in-situ steam that rise to cook food supported above said burner.

7 Claims, 3 Drawing Sheets

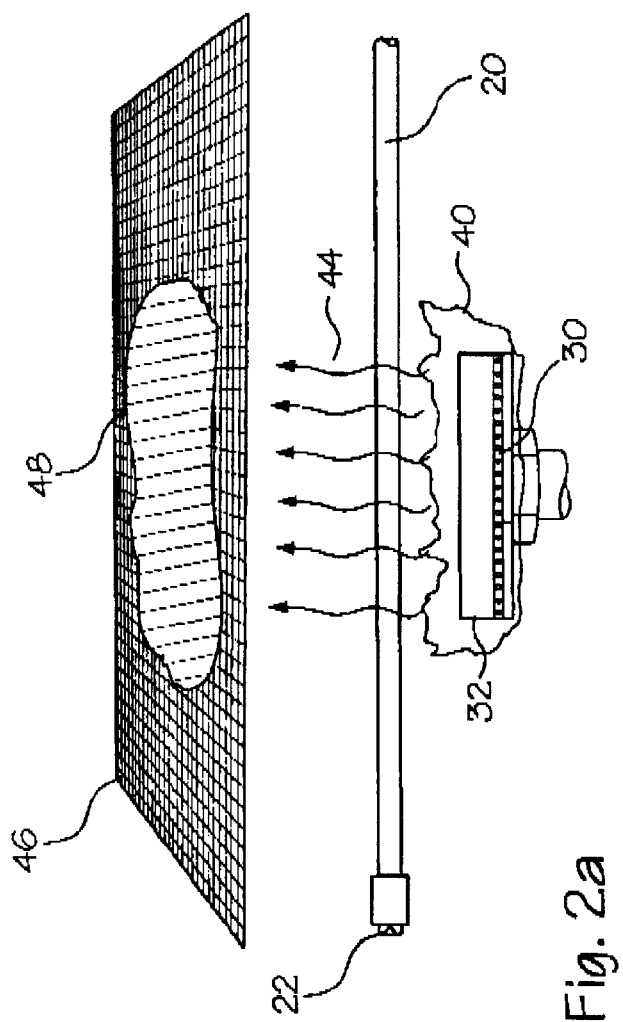
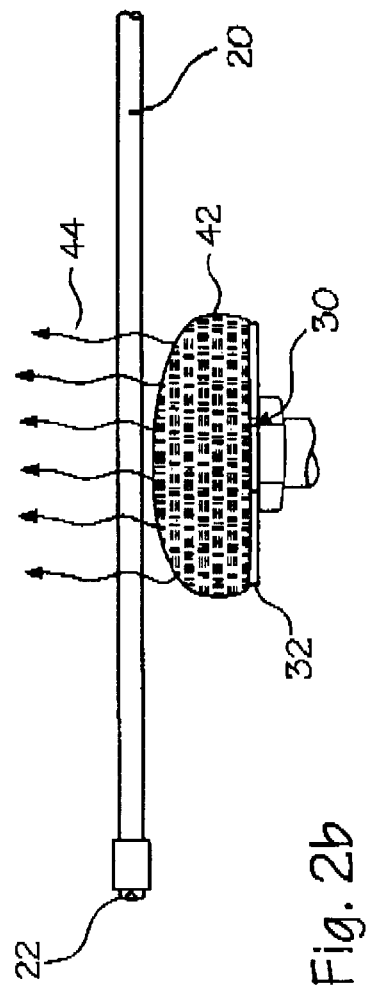

PROCESS FOR PRE-HEATING A HYDRO-FUEL AND PRODUCING IN-SITU STEAM FOR COOKING

PRIORITY CLAIM

The present application claims benefit of U.S. Provisional application No. 60/205598 filed on May 17, 2000.

BACKGROUND OF THE INVENTION

1. Field of the Invention

The present invention relates generally to a cooking process and, more specifically, a process for pre-heating a hydro-fuel and using the fuel with a barbecue grill having a flaming or catalytic glowing combustion mode that produces both heat and in-situ super-heated steam during combustion of hydro-fuels. Hydro-fuels are relatively volatile alcohol or hydrocarbon liquid fuels containing miscible water or water-in-oil micro-emulsions. The present invention relates to hydro-fuel cooking devices applicable for direct cooking of both meat and vegetables.

2. Description of the Prior Art

With respect to barbecue grills, it is a common practice to provide either gas or charcoal as a fuel source for the grill. Gas-fired barbecue grills mainly use liquefied propane gas (LPG). Hot gases from the flames heat the food items that are placed directly on the food support grid. In modern barbecue grills, non-combustible materials such as lava stones are used as a heat transfer media for uniform heating of food items. In charcoal grills, radiation from the glow of the hot coals heats the food item. The prior art contains extensive improvements in barbecue grill designs including a variety of burner designs, heat deflecting devices, surface cleaning strategies, and improvements to food support systems. However, the present invention is novel in that it provides a grill produces both heat and in-situ super-heated steam during combustion of hydro-fuels fuels that is used in cooking foods.

The use of the hydro-fuel alcohol specifically as a traditional fuel source in cooking stoves (or an indirect cooking device) is well known and is not reviewed here. A reference to the use of fuels other than common LPG gas or charcoal includes a solidified or semi-solidified alcohol. The U.S. Pat. No. 5,143,046 to Koziol teaches the use of gelled alcohol or a hydrocarbon type fuel in a barbecue grill. The methodology resembles the common food warming method that uses gelled alcohol commercially known as STERNO. The flame is diffusion type unlike the LPG premixed flame generally utilized in barbecue grills. The fuel vaporization rate is adjusted by varying the heat-exposed area of the solid fuel. In this surface combustion process, water, being the less volatile component, remains in the bottom of the gelled fuel reservoir. The present invention uses gasified premixed combustion and differs from this invention by bringing the water into the flaming region and producing continuous super-heated steam.

The U.S. Pat. No. 5,189,945 to Hennick relates to a water-cooled barbecue grill. Hennick teaches the use of circulating water from a reservoir to cool the cooking surface to prevent food from sticking to the surface. Food in the pans is cooked by heat from the water in the reservoir. The author claims the superiority of this barbecue grill based on the moist cooking which reduces food from crumbling and leaves the food tender. The present invention differs from Hennick in that super-heated steam created during combustion of hydro-fuels is directly applied in cooking foods.

One important obstacle to overcome in using liquid fuel burners is the problem of cold-starting the burning of the liquid fuel. This problem occurs due to condensation of atomized liquid fuel inside the fuel-air premixing tube before the mixture reaches the burner tip before the initial ignition of fuel. However, once the burner system is warm enough, the mixture will usually vaporize and burn without any problem. Historically, several approaches have been reported to overcome this problem. These approaches include pre-heating the burner system with gelled alcohol (also called STERNO), a burning wick soaked in a liquid fuel, a fire starter, electrical pre-heaters and so on. The U.S. Pat. No. 5,080,580 to Clapp teaches a method of using a pressurized liquid fuel with a minor amount of hydrocarbon gas as a propellant. The propellant-air mixture is fed into the combustion chamber and ignited easily, followed by the main liquid fuel. This invention teaches a much easier and reproducible method of eliminating the cold-start problem.

SUMMARY OF THE INVENTION

This invention provides a novel process of grilling that solves many of the deficiencies in the prior art by utilizing combustion of a new class of fuel compositions, which contain miscible water referred to as "hydro-fuels." A preferred embodiment uses fuel-grade ethanol containing a desired amount of water. Unlike petroleum products, ethanol is obtainable from renewable resources. The ethanol-water hydro-fuel produces in-situ steam for direct cooking in barbecue grills. Alternatively, alcohol may be the selected hydro-fuel and is particularly advantageous because of its low explosion hazard and stability in transport and storage. Unlike pressurized LPG, alcohol fuel is not pressurized during storage and transport, thus avoiding pressurized gas cylinders and increasing safety. The fuel tank is pressurized only before cooking. The absence of suffocating fumes and the generally low danger level in case of accidental leakage of the fuel makes the hydro-fuel user friendly.

More specific advantages of the present invention are provided by the continuous steam produced from in-situ combustion. The in-situ steam provides a moist cooking atmosphere, reduces cooking time, prevents food from crumbling, leaves a cleaner grill surface, and adds taste and tenderness to the directly cooked food.

Combustion of hydro-fuels containing water produces heat as well as steam. This steam is super-heated to flame temperatures. Along with convective heat from hot gases, the steam directly contacts the food item placed on the grill. This invention provides ways to improve the cooking method by using a new fuel composition and conceptual modifications designed to achieve the unique features indicated above.

Further, the present invention combines both heating and continuous steam generation in a single process, and thus eliminates the need for a separate steam chamber. The steam is produced continuously and is applied uniformly to the surface of the food. The steam provides a controlled temperature environment and hence gives a better taste for directly heated food. Because of use of cleaner combustion products, the method can be used for both indoor and outdoor cooking either in barbecue grills or normal cooking as a stove.

Accordingly, a first object of this invention is to provide a cooking device fueled by hydro-fuels that produces both heat and steam during combustion in a gas-fired grill. Hydro-fuels are relatively volatile alcohols or hydrocarbon liquid fuels containing miscible water or water-in-oil microemulsions. A preferred embodiment uses pressurized fuel-grade ethanol containing a desired amount of water as a source of fuel.

Another object is to retrofit a typical gas fired barbecue grill with a liquid fired burner by installing a suitable pre-heating tube or a coil just above the burner rim. The pre-heating coil vaporizes the liquid fuel before it is injected into the mixing chamber. A provision for drainage of condensed liquid inside the mixing tube is provided.

Another object of the invention is to provide a cooking device that can be used for both indoor and outdoors cooking of meat and vegetable items. For example, ethanol, being an oxygenated fuel, burns cleaner than any other hydrocarbon fuel such as methane, ethane, propane or butane. Hence, ethanol combustion is acceptable for indoor cooking.

Another object is to provide a cooking device that can be used both as a barbecue grill and a cooking stove. This objective can be achieved by using the cleaner burning ethanol, which is acceptable for direct heating of food. Campers do not want to cook steaks, hamburgers, or hot dogs for every meal. Many foods, particularly breakfast foods such as oatmeal, eggs, and corn, and a variety of vegetable items taste better when cooked over direct heat from a stove. Thus, it is desirable to provide a portable outdoor cooking apparatus that is capable of operating as both a barbecue grill and a stove using a single burner.

Another object of the present invention is to provide a barbecue grill that does not produce an open flame. A flameless combustion process may be achieved by inserting a catalytic wire mesh at the combustion zone. In the presence of a combustion catalyst surface, the flaming reactions will be shifted to a glowing surface combustion. The flame will completely disappear. This will reduce the chances of accidental fires. Catalytic combustion also provides cleaner combustion products. The heating is uniform because of infrared radiation.

Another object is to provide a barbecue grill with an option to collect fat and other condensates produced, including condensed steam during cooking. A concave plate is placed under the food support grid. The plate has a drip or a drain valve. Excess condensates that are collected can be drained if desired.

Another objective is to provide a barbecue grill where the surface remains relatively clean after cooking. Cleaning the grill surface is always a problem because it tends to become encrusted with food condensates, burner grease, and bits of food. Another problem associated with barbecue cooking is that some food types tend to crumble when cooked on thin metal rods. Conventional barbecues do not provide any means for steam cooking of meat or vegetables.

Yet another object is to eliminate the cold start problem generally encountered in liquid fuel ignition. This problem occurs due to condensation of atomized liquid fuel inside the fuel-air premixing tube before the mixture reaches the burner tip. However, once the burner system is warm enough, the mixture will usually vaporize and burn without any problem. The cold-start ignition problem is eliminated by first igniting the mixture inside the fuel-air mixing chamber, followed by an ignition at the burner tip.

These and other objects of the invention will be apparent to those persons skilled in the art from the following detailed description of a preferred embodiment of the invention.

BRIEF DESCRIPTION OF DRAWINGS

FIG. 2a is a partial schematic perspective view of various parts of the hydro-fuel barbecue grill of the present invention.

FIG. 2b is a partial schematic plan view of various parts of the present invention including a flameless heating element.

DETAILED DESCRIPTION OF THE PREFERRED EMBODIMENT

Figure 1:
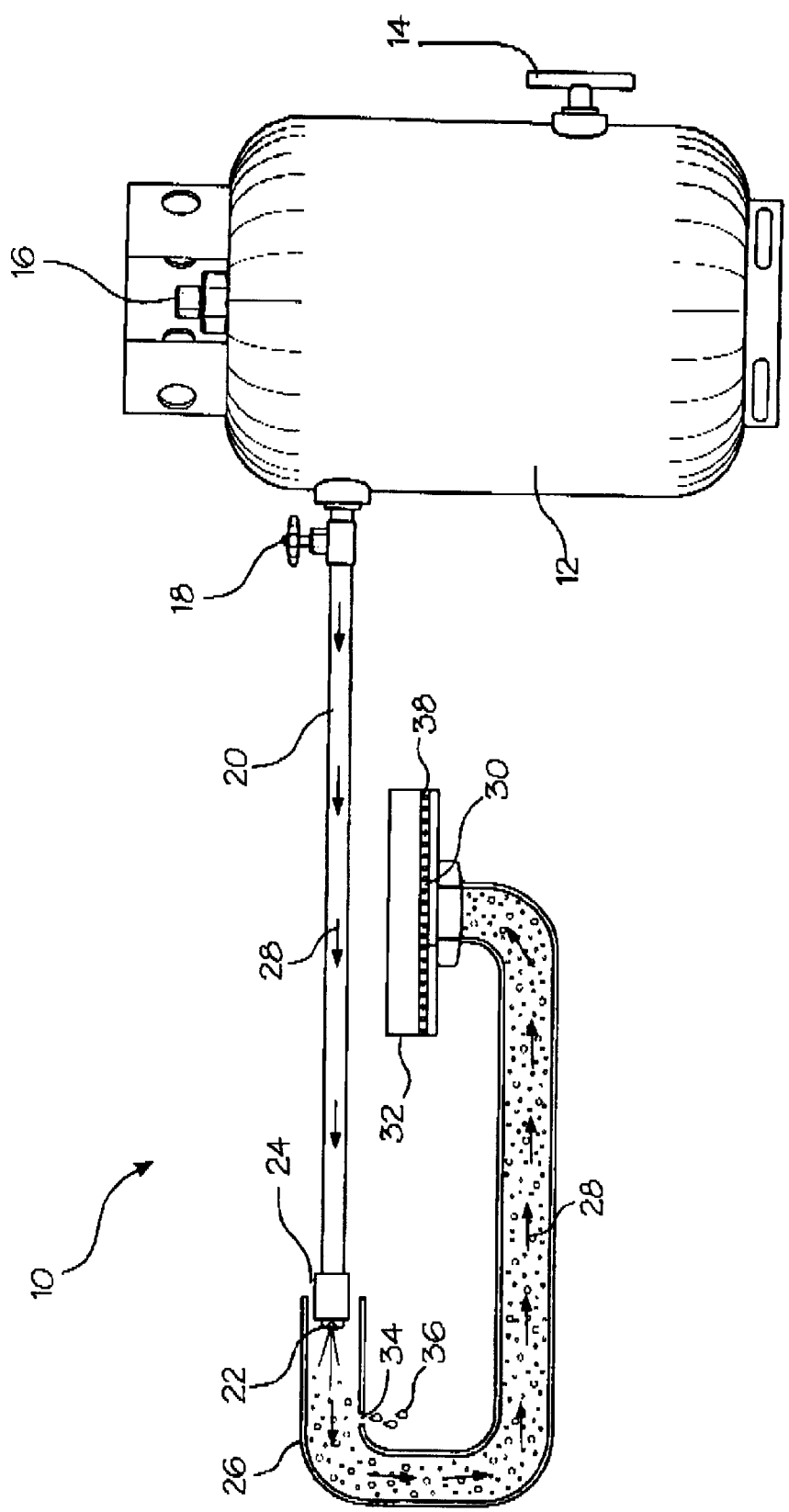
FIG. 1 is a schematic plan view of the present invention illustrating the liquid fuel tank, hand pump, pre-heating tube and the burner assembly of hydro-fuel barbecue grill.

Referring to the drawings, a process and apparatus for producing in-situ steam during combustion of hydro-fuels and its application to direct-heated cooking in a barbecue grill or an indirect cooking stove is disclosed. In its preferred embodiment, the invention uses a fuel-grade ethanol containing water as a liquid hydro-fuel pressurized with air. Any hydro-fuel having properties of combustion and stability suitable for production heat and in-situ steam may be utilized by the invention. Suitable hydro-fuels include alcohols such as methanol, ethanol, and propanol in either liquid or gelled form. Further, hydro-fuels include hydrocarbon liquid fuels containing miscible water or water-in-oil microemulsions such as pentane, hexane, and octane.

FIG. 1 illustrates the liquid fuel storage tank 12, hand pump 14, pre-heating tube 20, fuel injection nozzle 22, and the burner system of the hydro-fuel grill. The liquid fuel is stored in the fuel tank 12, which has a refill-cap 16. A flow control valve 18 is provided at the outlet of the fuel tank 12 to release and propel into the pre-heating tube 20 a desired mass flow of the liquid fuel indicated by the arrows 28 showing the flow of the liquid fuel. The fuel may be pressurized using a hand pump 14 that is shown built into the fuel tank 12. Alternatively, in place of a hand pump 14, the fuel tank 12 may be pressurized with secondary fuel gases such as butane or propane from an external source using an adapter, or non-combustible propellant gases such as $N_2$ or $CO_2$ gases could be used. Further, a pressurized cylinder could be especially adapted or an air compressed could be used to propel the hydro-fuel flow into the pre-heating tube.

Upon release from the fuel tank 12, the fuel vapor 28 passes through a pre-heating tube 20 as shown in FIG. 1. The pre-heating tube 20 may be a stainless steel or copper tube 20 or a coil (as in FIG. 4) placed just above the heat distribution source 32 such as a burner unit or flame holder. The function of the pre-heating tube 20 is not only to transport the fuel to the burner 32 but to vaporize the fuel before injection using the heat from the burner flame. A fine nozzle 22 produces a fuel jet creating a venturi action. Because of the low pressure created by the accelerated flow through the nozzle 6, ambient air rushes into the system through the ventilation hole 34. Arrows 28 show the flow of fuel in the pre-heating tube 20 and fuel-air mixture inside a mixing tube 26. The mixture issues out of the tip of the burner tube 30 below the flame holder 32. Before the initial ignition, when the pre-heating 20 and the mixing tubes 26 are relatively cold, the liquid fuel often condenses and drops out of the tube 26 through the hole 34 as shown by 36. Therefore, the combustible fuel air mixture does not reach the tip of the burner tube 10 and hence cannot be ignited at a typical location such as 14. This is usually referred as the cold-start problem with liquid-fired burner systems. In order to overcome the cold-start problem, the pre-heating tube and the burner tubes are usually heated by ignition aids such as gelled alcohol (Sterno) or various types of fire-starters. However, the present invention provides a new method to overcome the cold-start problem. The method involves a double ignition approach. The double ignition approach means igniting first at the fuel condensing holes 34 located in the mixing tube 26. The mixture ignites inside the premixing tube 26 producing a hissing sound. The flame usually terminates by itself, producing a hot fuel-air mixture that passes through the tip of the burner 30. The mixture is now ignited at the burner tip 38. This process of double ignition is highly reproducible and does not require any pre-ignition aids. The blue flame becomes stable after a few seconds. Ignition can be achieved by an open pilot flame or a piezoelectric device attached to the system.

As illustrated in FIG. 2, the premixed flame 40 is stabilized by a perforated flame holder or a bluff body 32. The premixed hydro-fuel vapor and air burn and produce steam at elevated temperatures. The super-heated steam produced from the combustion of the hydro-fuel flows upward along with hot gases, as shown by the upward arrows 44. The hydro-fuel combustion yields well-controlled continuous steam or steam aerosol that contacts the food placed above the heat source. A metal grid that functions as a food support 46 is placed above the flame, the vertical distance of which can be varied. A food item 48 is placed on the food support 46. The in-situ steam 44 produced along with hot gas contacts the food item 48. The body of the barbecue grill may have any desired shape.

An alternate embodiment includes a flameless glowing heating element 42 produced from the catalytic combustion of hydro-fuels. In this embodiment, the visible flame 40 is replaced by a catalyst surface in the form of a mesh, a wire-plug, or a honeycomb structure as shown by 42. A thin coating of the catalyst compound such as platinum, palladium, alloys of platinum and palladium, or transition metals is provided on the substrate. In the presence of the catalyst, the gas phase combustion will be shifted to surface combustion. The catalyst surface 42 starts glowing like a heating filament and radiates heat as seen in conventional charcoal grills. The flameless grill may be useful for indoor cooking where an open fire or a flame is not desirable. Moreover, the catalytic combustion yields cleaner combustion products.

Figure 3:
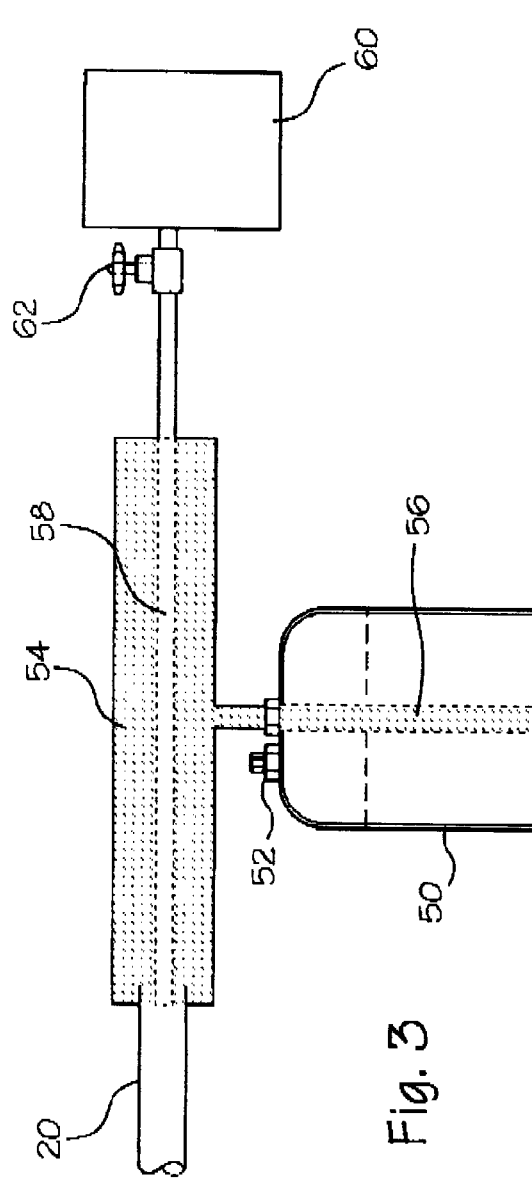
FIG. 3 is a plan view of various parts of the present invention depicting fuel transfer by blowing air through a porous medium that is soaked with hydro-fuel.

In addition to a hand pump 14, other variations are available for supplying the liquid fuel to the pre-heating tube 20. An electric mini-blower or pressurized propellant cartridges containing gases such as $CO_2$ and $N_2$ may be utilized to transport the fuel to the pre-heating tube 20. FIG. 3 shows a schematic of an alternate fuel transport system in which the fuel from the tank 50 is transported into a tube containing a porous medium 54 using a wick 56 or absorbing media which is inserted inside the fuel tank 50. The liquid fuel is transported into to the porous medium 54 by the capillary action. The porous medium 54 has an annular empty or a low porosity passage 58, through which air or the propellant gas from 60 passes through. The gas saturated with the liquid fuel enters the pre-heating coil 20. The flow is controlled by a control valve 62. The fuel tank has a fuel refill cap 52. The porous medium 54, as well as the wick 56, may consist of materials such as cotton, cellulose acetate, carbon cloth, and fiberglass. The mini-blower 60 may be powered by re-chargeable batteries or other sources of power.

Figure 4:
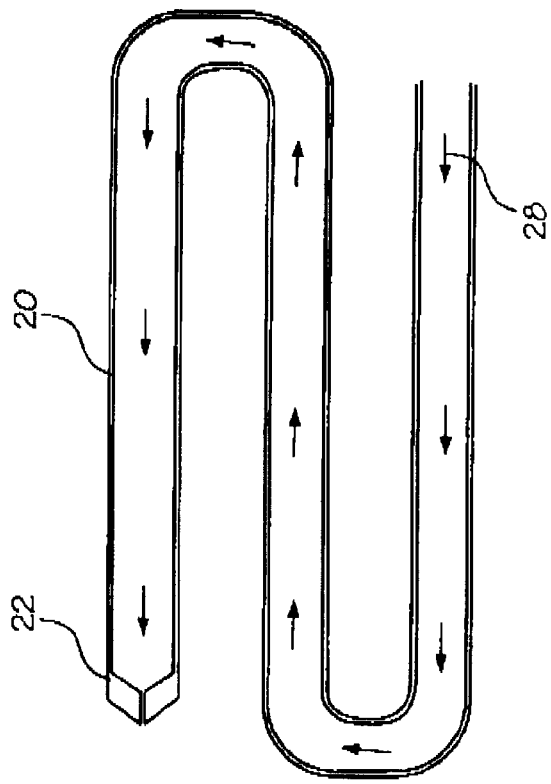
FIG. 4 is a partial plan view of a pre-heating tube in the form of a coil.

FIG. 4 shows an example of an alternative pre-heating tube 20 in the form of a pre-heating coil 20. This coiled design provides increased heat transfer area for the liquid fuel to be vaporized. Various other add-ons may be provided on the grill including a concave deflector at the burner base for focusing heat onto the cooking area. A concave plate may be used to collect fat and meat constituents and re-generate smoke for adding flavor to food.

While the present invention has been particularly shown and described with reference to an embodiment thereof, it will be understood by those skilled in the art that various changes in form and detail may be made without departing from the spirit and scope of the present invention.

We claim:

1. A process of cooking foods comprising the following steps:
   a. providing a source of a hydro-fuel comprised of a hydrocarbon containing miscible water or water-in-oil microemulsion;
   b. propelling a regulated flow of the hydro-fuel into a pre-heating tube situated near a burner,
   c. pre-heating the hydro-fuel;
   d. mixing flue hyrdro-fuel with air in a mixing chamber to form a fuel-air mixture;
   e. transporting the fuel-air mixture to a burner tip on said burner; and
   f. igniting the fuel-air mixture at said burner tip to cause combustion producing the release of hot gases and in-situ steam that rise to cook food supported above said burner.

2. A process of cooking foods as claimed in claim 1 including the interim step of igniting the fuel-air mixture in the mixing chamber to provide for cold start ignition of the fuel-air mixture prior to igniting the fuel-air mixture.

3. A process of cooking foods as claimed in claim 2 in which ignition of the fuel-air mixture in the mixing chamber is accomplished using an open pilot flame or piezoelectric device.

4. A process of cooking foods comprising the following steps:
   a. providing a source of a hydro-fuel is comprised of an alcohol containing water;
   b. propelling a regulated flow of the hydro-fuel into a pre-heating tube situated near a burner;
   c. pre-heating the hydro-fuel;
   d. mixing the hyrdro-fuel with air in a mixing chamber to form a fuel-air mixture;
   e. transporting the fuel-air mixture to a burner tip on said burner; and
   f. igniting the fuel-air mixture at said burner tip to cause combustion producing the release of hot gases and in-situ steam that rise to cook food supported above said burner.

5. A process of cooking foods as claimed in claim 4 in which said alcohol is an ethanol.

6. A process of cooking foods as claimed in claim 1 in which said regulated flow of the hydro-fuel into a pre-heating tube is propelled by air pressure caused by using a hand pump.

7. A process of cooking foods as claimed in claim 1 in which a venturi is used to cause a flow of air into the mixing chamber for mixing the hydro-fuel with air in a mixing chamber to form a fuel-air mixture.

\* \* \* \* \*